United States Patent [19]

bij de Leij

[11] 4,315,760
[45] Feb. 16, 1982

[54] METHOD AND APPARATUS FOR DEGASING, DURING TRANSPORTATION, A CONFINED VOLUME OF LIQUID TO BE MEASURED

[76] Inventor: Jan D. bij de Leij, Veensluis 24-30, Heerenveen, Netherlands

[21] Appl. No.: 112,909

[22] Filed: Jan. 17, 1980

[51] Int. Cl.³ .............................................. B01D 19/00
[52] U.S. Cl. ........................................... 55/46; 55/55; 55/166; 55/168; 55/170; 55/189
[58] Field of Search ...................... 55/46, 55, 164–170, 55/189

[56] References Cited

U.S. PATENT DOCUMENTS

| 1,255,018 | 1/1918 | Jones | 55/170 X |
| 1,879,930 | 9/1932 | Gibson | 55/165 |
| 2,195,898 | 4/1940 | Newton | 55/170 |
| 3,314,219 | 4/1967 | Griffin et al. | 55/167 |
| 3,325,974 | 6/1967 | Griffin et al. | 55/167 |
| 3,416,547 | 12/1968 | Glenn, Jr. et al. | 55/167 X |
| 3,815,329 | 6/1974 | Pande-Rolfsen | 55/189 X |

FOREIGN PATENT DOCUMENTS

| 2249170 | 4/1973 | Fed. Rep. of Germany | 55/168 |
| 2378548 | 9/1978 | France | 55/164 |

Primary Examiner—Robert H. Spitzer
Attorney, Agent, or Firm—Weingarten, Schurgin & Gagnebin

[57] ABSTRACT

Method and apparatus for degasing a confined volume of liquid to be measured, during the transportation of the liquid from a first vessel to a second vessel via a gas separation vessel and a volumeter. Degasing is promoted by regulating the supply to, and discharge from the degasing vessel dependent on a subatmospheric pressure to be maintained therein.

5 Claims, 2 Drawing Figures

METHOD AND APPARATUS FOR DEGASING, DURING TRANSPORTATION, A CONFINED VOLUME OF LIQUID TO BE MEASURED

This invention relates to a method of degasing a confined volume of liquid to be measured, during the transportation of the liquid from a liquid supply vessel to a liquid storage vessel. The method comprises withdrawing the liquid from the liquid supply vessel and passing it to a gas separation vessel and, simultaneously, or non-simultaneously with the supply to the gas separation vessel, withdrawing the liquid from the gas separation vessel, and passing it by way of a volumeter to the liquid storage vessel. At least the discharge of the liquid from the gas separation vessel by way of the volumeter to the liquid storage vessel is made dependent on the pressure in the gas separation vessel.

A method having a generally similar purpose is described in Dutch patent application No. 76,07497. In the prior method, the liquid discharge from the gas separation vessel is mainly controlled by a superatmospheric pressure that is maintained in the gas separation vessel.

It is an object of the present invention to provide an improved method which makes it possible to make more accurate measurements, which is of great importance, in particular when used in a milk collecting tanker, as the amount paid to the farmer is directly proportional to the metered amount of milk taken in.

The present invention is characterized in that the supply and discharge of the liquid to, and from, the gas separation vessel is made dependent on a subatmospheric pressure to be maintained in the gas separation vessel.

The method according to the invention makes it possible that in the separation vessel smaller air bubbles entrained in the liquid can also expand and escape, whereby the accuracy of the volumetric measurement is greatly promoted.

The invention also relates to an apparatus suitable for carrying out the method according to the invention. In the apparatus the gas separation vessel is provided with a liquid supply conduit to be connected to the liquid supply vessel, a liquid discharge conduit connected by way of the volumeter and then a first valve to the liquid storage vessel, and a gas discharge conduit comprising a second valve. The bottom portion of the gas separation vessel is connected to the liquid discharge conduit, that bottom portion being of greatly reduced cross-sectional area relative to that of the top portion, to which the liquid supply conduit is connected. The apparatus also comprises a level switch responsive to the liquid level in the bottom portion and affecting the position of the first and the second valve and being connected with a first time switch, and a control means responsive to a higher liquid level present in the separation vessel. The liquid discharge conduit comprises after the first valve a liquid pump means which is also capable of transporting gas to a sufficient extent, the suction side of the pump being connected to the gas discharge conduit in which is connected the second valve. The control means is a second level switch affecting the position of the first and the second valve either simultaneously or non-simultaneously, the second level switch being connected with a second time switch.

A liquid pump means suitable for use in the apparatus according to the invention is, for example, the Jabsco pump, marketed by ITT, which is provided with a liquid impeller made of rubber material. In normal use, this is a self-priming pump to an elevation of approximately 5 meters, and even up to approximately 7 meters, if previously filled with the liquid to be pumped. Other liquid pumps, however, such as displacement pumps, which are capable of transporting gas, such as air, to a sufficient extent, are suitable for use in the arrangement of the apparatus according to the invention.

The objects, features and advantages of this invention will be readily apparent when read in conjunction with the accompanying drawing, in which.

Figure 1:
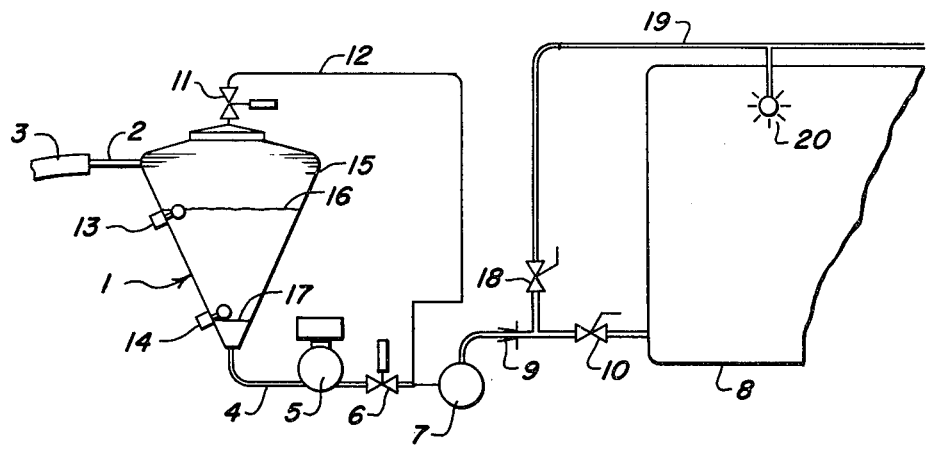
FIG. 1 is a diagramatic representation of the apparatus of the invention.

The embodiments shown in the drawing are suitable for use with a milk collecting system in which, in accordance with a pre-determined schedule, a tanker collects milk produced on the farms, and often stored in cooled milk tanks, for transportation to dairy factories for further processing. The quantity by volume registered as the milk is being taken in by the tanker forms a basis for the price to be paid to the farmer. Accurate measurement, therefore, is of prime importance.

Referring to FIG. 1, there is shown a gas separation vessel 1. Reference numeral 2 designates a milk supply conduit through which milk is supplied to the gas separation vessel. Conduit 2 is to be connected in gastight fashion to the milk tank on the farm by means of a hose 3 in a known manner, not shown. At the bottom, the gas separation vessel, which is strongly tapered downwards, is provided with a milk discharge conduit 4, which via throughflow quantity meter or volumeter 5, valve 6, which for example may be an electrically operable valve, and pump 7 is connected to the milk storage vessel 8 present on the tanker. Pump 7 is connected on the suction side of the gas separation vessel also via gas discharge conduit (air discharge conduit) 12, equipped with a valve 11, also preferably electrically operable, to the top of gas separation vessel 1.

At different levels, namely in the narrow bottom portion and in the wider top portion 15 of the gas separation vessel, there are provided two level switches 14 and 13, respectively, each connected to first and second time switches, respectively, not shown. Level switch 14 responds to level 17 of the milk in the gas separation vessel in the sense that always a minimum stock of milk, as represented approximately by milk level 17, is maintained. Switch 13 reacts in an analogous manner to a maximum stock of milk to be maintained in gas separation vessel 1, approximately represented by milk level 16.

The operation of the embodiments of the apparatus according to the invention shown in the drawing can be described as follows.

After connection of hose 3 to the milk tank present on the farm, pump 7 is switched on. When pumping begins, gas separation vessel 1 contains the minimum stock of milk to level 17, valve 6 being closed and valve 11 being opened. In this combination of positions of valves 6 and 11, pump 7 with withdraw air from the gas separation vessel 1 and generate a subatmospheric pressure therein. Through hose 3 and milk supply conduit 2, milk is supplied to the gas separation vessel. As the milk level 17 is increased, switch 14 will operate the first time switch, the function of which will be described later. The increasing milk level ultimately reaches level switch 13, by means of which valve 6 is opened and valve 11 is closed. Under the influence of the suction by pump 7, milk is now withdrawn from gas separation vessel 1, and, while the quantity by volume thereof is simultaneously measured in meter 5, pumped via a non-return valve 9 and a valve 10 into milk tank 8. During the pumping away of milk from the gas separation vessel, the supply of milk to this vessel naturally continues. If, during this phase, owing to unforeseen contingencies, an extra quantity of air is supplied to the gas separation vessel along with the milk, the result will be that the maximum milk level is decreased, as a result of which level switch 13 is put into operation, and as a consequence of which valve 6 is closed and valve 11 is opened. The extra amount of air supplied is then withdrawn from the gas separation vessel by pump 7 and the milk level is increased again until level switch 13 operates to open valve 6 and close valve 11 and the discharge of milk from the gas separation vessel is resumed.

When the tank on the farm has been emptied, a large amount of air will be abruptly supplied via hose 3 and conduit 2 to the gas separation vessel. As a consequence, the milk level in the gas separation vessel will decrease to a considerable extent, as a consequence of which, under the influence of level switch 13, valve 6 is closed and simultaneously valve 11 is opened, and the second time switch is put into operation. During this period, the remainder of milk present in the farm tank and hose 3 are supplied to the gas separation vessel. When the time set through the second time switch has lapsed, the time switch switches valve 6 back into its open position and valve 11 into its closed position, whereafter the milk present in the gas separation vessel is again withdrawn. When the milk has reached the minimum level 17, level switch 14 will close valve 6 and open valve 11, and this terminates the cycle.

The function of the first time switch connected with level switch 14 is that, if after the pump has begun to draw milk from the farm tank the amount of milk supplied to the gas separation vessel is insufficient to cause the milk level to rise to level switch 13, valve 6 will be opened and valve 11 will be closed after the time set by the first time switch has lapsed.

Figure 1A:
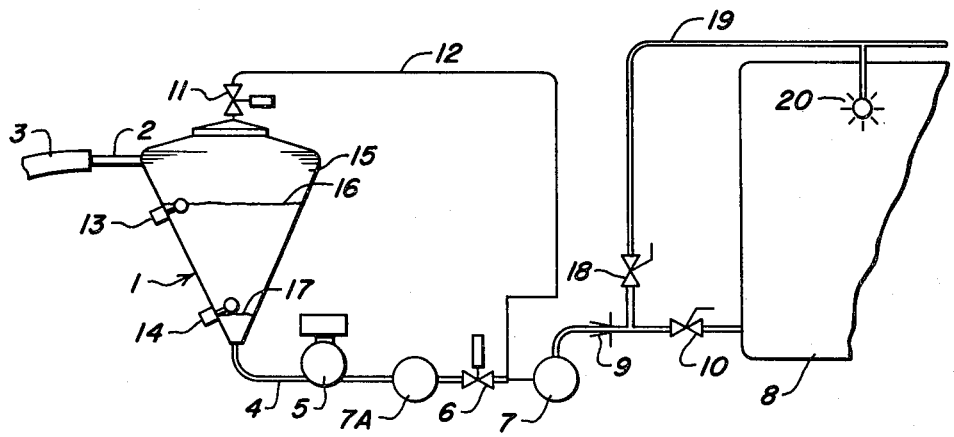
FIG. 1A is a diagramatic representation of a second embodiment of the apparatus shown in FIG. 1.

If, when a given volumeter 5 is used and the flow resistance is too high, and consequently the capacity of the installation insufficient, or, if for any other reason, it is desirable for the pump capacity with regard to the milk to be pumped from the gas separating vessel to be increased, this can be achieved by including in discharge conduit 4 a second pump, either upstream or downstream of pump 7, which is connected so that it is preferably put into operation if the milk level exceeds level 16. Such a second pump 7A is illustrated in FIG. 1A in conduit 4 upstream of pump 7.

The apparatus shown in the drawing also comprises provisions through which the installation, in particular milk storage vessel 8, can be cleaned. Via a switch not shown, for this purpose the level switches 14 and 13 can be put out of operation and valves 6 and 11 can be opened and closed, respectively. Furthermore, valve 18 is opened and valve 10 is closed. Hose 3 is connected to a supply vessel containing a cleaning fluid. Pump 7 is put into operation and will pump the cleansing fluid through hose 3, gas separation vessel 1, meter 5, non-return valve 9, valve 18, conduit 19 and one or more spray bulbs 20 into milk tank 8, which together with all the piping is cleaned.

Naturally the embodiment of the apparatus described above and shown in the accompanying drawing can be modified without departing from the scope of the invention. Thus, for example, the electrically operated level switches, which may be float switches, and the air operated valves 11 and 6 can be replaced by analogously operating devices.

I claim:

1. A method of degassing a confined volume of a liquid to be measured during the transportation of the liquid from a liquid supply vessel to a liquid storage vessel by means of apparatus including a gas separation vessel, a liquid volume meter, a fluid vacuum pump, a first valve selectively connecting the suction side of the pump to the bottom of the gas separation vessel, a second valve selectively connecting the suction side of the pump to the top of the gas separation vessel, a first switch responsive to a first liquid level in the gas separation vessel and a second switch responsive to a higher second liquid level in the gas separation vessel, said method comprising the steps of:

supplying liquid from the liquid supply vessel to the gas separation vessel until the liquid supply vessel is empty;

operating the vacuum pump;

opening the second valve in response to the first liquid level being detected by the first switch to permit withdrawal of gas from the gas separation vessel by the vacuum pump;

closing the first valve in response to the first liquid level being detected by the first switch to permit the liquid level in the gas separation vessel to rise;

closing the second valve in response to the second liquid level being detected by the second switch to prevent the withdrawal of gas from the gas separation vessel by the vacuum pump;

opening the first valve in response to the second liquid level being detected by the second switch to permit withdrawal of liquid from the gas separation vessel to the liquid storage vessel through the volume meter by the vacuum pump;

reclosing the second valve in response to detection by the second switch of the level of the liquid in the gas separation vessel falling from the second liquid level to a point between the second liquid level and the first liquid level; and reopening the first valve when the second valve is reclosed.

2. Apparatus for degassing a confined volume of liquid to be measured during the transportation of the liquid from a supply vessel to a liquid storage vessel, said apparatus comprising:

a gas separation vessel having a top and a bottom;

means providing fluid communication between said supply vessel and said gas separation vessel;

a liquid discharge conduit providing liquid communication between said bottom of said gas separation vessel and said liquid storage vessel;

means disposed in said liquid discharge conduit for measuring the volume of liquid passing therethrough;

a gas discharge conduit providing gas communication with said top of said gas separation vessel;

a continuously operating fluid vacuum pump connected on the suction side thereof to said liquid discharge conduit and to said gas discharge conduit;

a first valve disposed in said liquid discharge conduit between said vacuum pump and said gas separation vessel and adapted to be selectively opened to permit said vacuum pump to withdraw liquid from said gas separation vessel to said liquid storage vessel through said liquid discharge conduit and to be selectively closed to prevent the flow of liquid from said gas separation vessel through said liquid discharge conduit;

a second valve disposed in said gas discharge conduit between said gas separation vessel and said vacuum pump and adapted to be selectively opened to permit said vacuum pump to withdraw gas from said gas separation vessel through said gas discharge conduit and selectively closed to prevent the flow of gas from said gas separation vessel through said gas discharge conduit;

a first level switch responsive to a first liquid level in said gas separation vessel and being operative to open said second valve and to close said first valve when the level of the liquid falls to said first liquid level; and a second level switch responsive to a second liquid level higher than said first liquid level in said gas separation vessel, said second level switch being operative to open said first valve and to close said second valve when the level of the liquid rises to said second liquid level and to open said second valve and close said first valve when the level of the liquid falls to a point between said second liquid level and said first liquid level from said second liquid level.

3. The apparatus according to claim 2 further comprising first timing means associated with said first level switch and being operative to open said first valve and to close said second valve if the level of the liquid in said gas separation vessel does not rise to said second liquid level a first specified period of time after rising above said first liquid level.

4. The apparatus according to claim 2 further comprising second timing means associated with said second level switch for opening said first valve and closing said second valve if the level of the liquid in said gas separation vessel fails to rise to said second liquid level a second specified period of time after falling below said second liquid level.

5. The apparatus according to claim 2 further comprising a second pump upstream of said fluid pump on said liquid discharge conduit adapted for pumping liquid from said gas separation vessel, said second pump being actuated by said second level switch when the level of said liquid in said gas separation vessel exceeds said second liquid level.

* * * * *